(12) United States Patent
Gupté

(10) Patent No.: US 6,202,998 B1
(45) Date of Patent: Mar. 20, 2001

(54) APPARATUS FOR SUPPORTING A SHEET MATERIAL ALONG ITS PERIPHERAL EDGES

(75) Inventor: Sunil Gupté, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/454,089

(22) Filed: Dec. 3, 1999

(51) Int. Cl.[7] .................................................. B25B 5/00
(52) U.S. Cl. .......................... 269/239; 269/216; 269/217; 269/275; 269/286
(58) Field of Search ..................... 269/239, 286, 269/216, 217, 275, 229, 232; 38/64

(56) References Cited

U.S. PATENT DOCUMENTS

| | | |
|---|---|---|
| 2,985,304 * | 5/1961 | Chryst et al. ................... 269/239 |
| 4,379,101 | 4/1983 | Smith . |
| 4,609,519 | 9/1986 | Pichard et al. . |
| 4,796,877 * | 1/1989 | Musil et al. .................... 269/239 |
| 4,812,284 | 3/1989 | Fleissner . |
| 4,923,555 | 5/1990 | Elliott et al. . |
| 4,943,222 | 7/1990 | Nathoo . |
| 5,085,580 | 2/1992 | Reunamaki . |
| 5,108,532 | 4/1992 | Thein et al. . |
| 5,108,691 | 4/1992 | Elliott . |
| 5,575,080 | 11/1996 | Fleissner . |
| 5,595,375 * | 1/1997 | Bennhausen ................... 269/239 |
| 5,696,328 * | 12/1997 | Underwood et al. .......... 269/234 |
| 5,797,580 * | 8/1998 | Ryberg ............................ 269/228 |

* cited by examiner

Primary Examiner—Stephen F. Gerrity
Assistant Examiner—Lee Wilson
(74) Attorney, Agent, or Firm—Brooks & Kushman P.C

(57) ABSTRACT

An apparatus for supporting a thermoformable material along its peripheral edges includes a frame forming a channel therealong for receiving the peripheral edges of the thermoformable material. The channel has an opening formed between first and second edges of the frame. At least one retaining arm is pivotally connected to the frame along the first edge and includes a distal end. The retaining arm is pivotable between an open position to allow insertion of the peripheral edge of the thermoformable material into the channel and a closed position for clamping the thermoformable material between the distal end and the second edge.

13 Claims, 2 Drawing Sheets

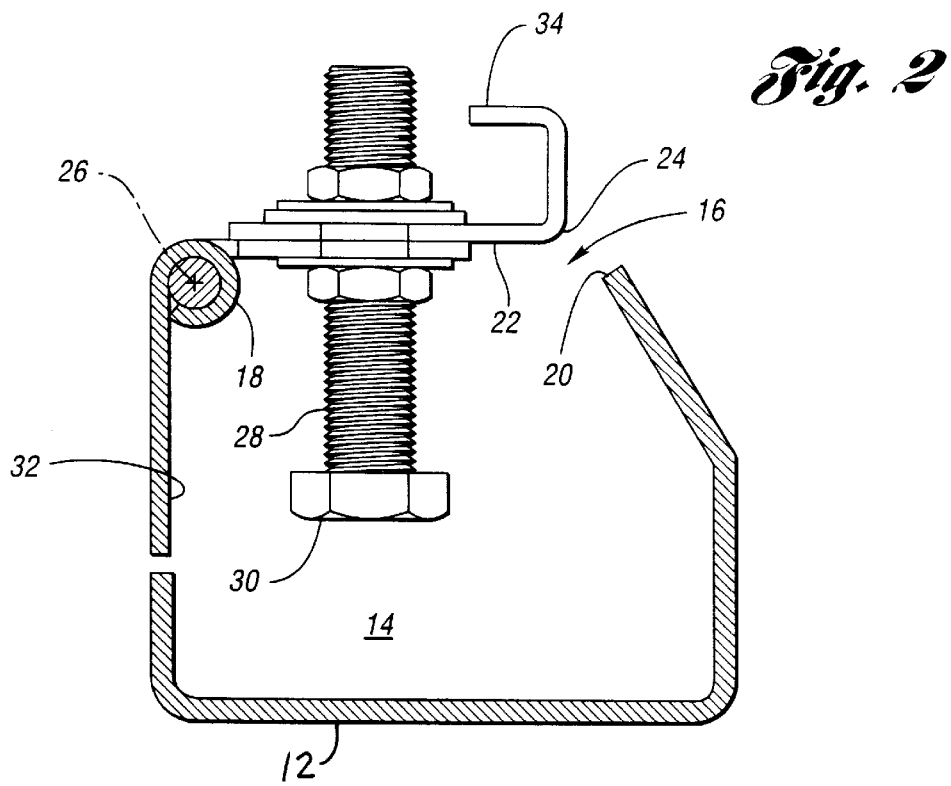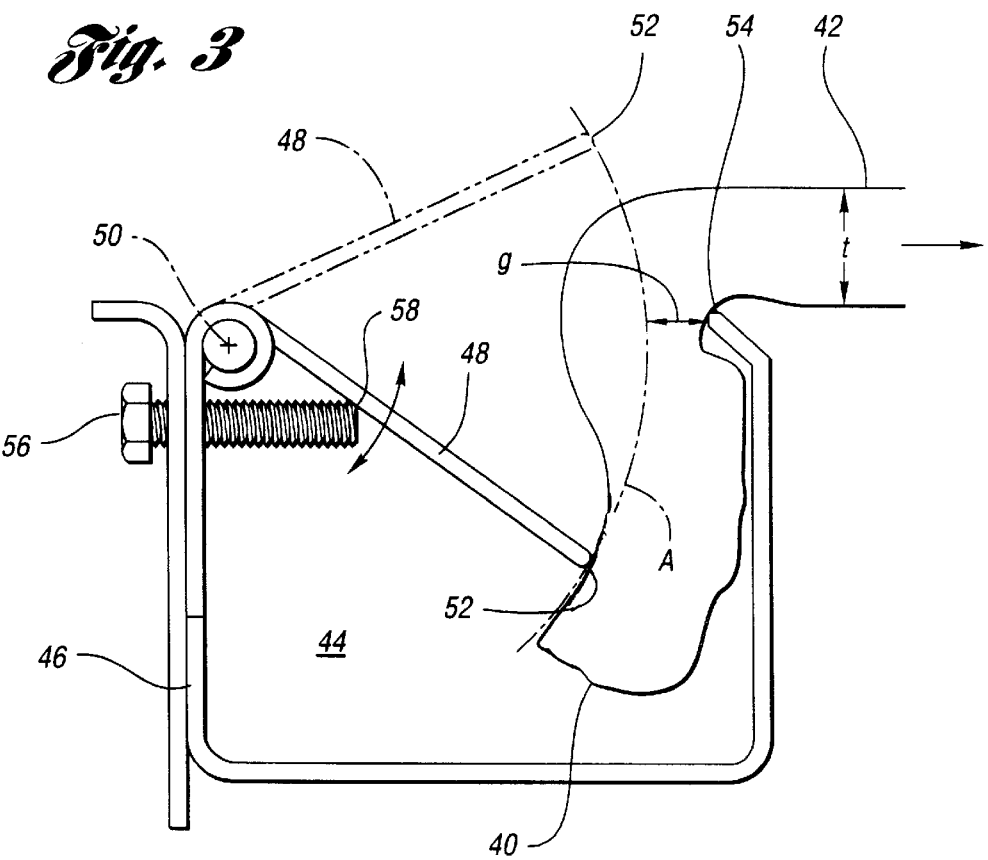

APPARATUS FOR SUPPORTING A SHEET MATERIAL ALONG ITS PERIPHERAL EDGES

TECHNICAL FIELD

The present invention relates to an apparatus for supporting a thermoformable material along its peripheral edges for automated transfer before and after preheating operations prior to thermoforming and during forming in a mold cavity.

BACKGROUND ART

A prior art method of preheating a thermoformable material, including thermoset and thermoplastic materials, involves contact heating. The contact heating method includes placing the material in direct contact with a heat source, such as thermally regulated upper and lower platens. Heat is then transferred principally by conduction from the outer surface to the inner core of the material. Because such materials are typically poor conductors of heat, however, this method requires a significant amount of time to sufficiently heat the materials.

Another method of preheating a thermoformable material involves radiant heating. This method involves placing the material near a radiant heat source, such as electric coils or ceramic heaters. The outer portions of the material, however, tend to selectively absorb the radiant energy, and core heating is again accomplished primarily by conduction. Consequently, this method also requires a significant amount of time to sufficiently heat the material.

A significant improvement over prior art methods of preheating a thermoformable material is described in commonly owned U.S. patent application Ser. No. 09/082,743, entitled "Method And Apparatus For Preheating Permeable, Thermoformable Material", which is hereby incorporated by reference in its entirety. This application provides a method and apparatus for preheating a permeable, thermoformable material having first and second sides, and includes a housing and first and second retaining members cooperable with each other to sufficiently retain the material within the housing. A fluid distribution system is disposed within the housing and is adapted to be connected to a source of heated fluid. The fluid distribution system is operative to introduce heated fluid onto the first side of the material. In addition, the housing is adapted to cooperate with a negative pressure source for developing a suction on the second side of the material to draw the heated fluid through the material, thereby convectively heating the material. In this design, the thermoformable material is held along its peripheral edges by a plurality of screws or nails which are supported on a frame. This feature requires the operator to press the thermoformable material onto the screws or nails to attach the thermoformable material to the frame, which adds labor and assembly costs to the manufacturing process, and does not lend itself to robotic handling.

Accordingly, it is desirable to provide an improved apparatus for holding the peripheral edges of the thermoformable sheet material onto a frame in a manner which is easily clamped and unclamped, and lends itself to robotic operation, and also prevents heat losses by leakage along the peripheral edges of the thermoformable sheet material.

DISCLOSURE OF INVENTION

The present invention overcomes the above-referenced shortcomings of prior art assemblies by providing an apparatus for supporting a thermoformable material along its peripheral edges which includes a frame forming a channel therein for receiving the peripheral edges, and at least one retaining arm pivotally connected to the frame for clamping the peripheral edges into the channel formed by the frame by pivoting the retaining arm past an edge of the frame for clamping the thermoformable sheet between the retaining arm and the edge. In this configuration, the retaining arm cooperates with the thermoformable material to act as an over-center spring device which clamps the peripheral edges of the thermoformable material when moved past the edge of the frame into the channel to secure the peripheral edge and prevent leakage of air blown or drawn in either direction through the thermoformable material.

More specifically, the present invention provides an apparatus for supporting a thermoformable material along its peripheral edges, including a frame forming a channel therealong for receiving the peripheral edges of the thermoformable material. The channel includes an opening formed between first and second edges of the frame. At least one retaining arm is pivotally connected to the frame along the first edge and includes a distal end. The retaining arm is pivotable between an open position to allow insertion of the peripheral edge of the thermoformable material into the channel and a closed position for clamping the thermoformable material between the distal end and the second edge.

The present invention is useful for clamping not only a thermoformable material along its peripheral edges for automated transfer before and after preheating operations prior to thermoforming and during forming in a mold cavity, but also useful in other environments for clamping a variety of sheet materials for operations thereon, such as heating, printing, etc.

Accordingly, an object of the invention is to provide an apparatus for supporting a sheet material along its peripheral edges in a manner which does not require significant handling of the sheet material for installation and removal, and in which a seal is provided along the peripheral edges of the material to prevent escape of air which is blown or drawn through the sheet material.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a cross-sectional view taken at line 2—2 of FIG. 1; and

FIG. 3 shows a cross-sectional view of a support frame and thermoformable material in accordance with a second embodiment of the invention.

BEST MODE FOR CARRYING OUT THE INVENTION

Figure 1:
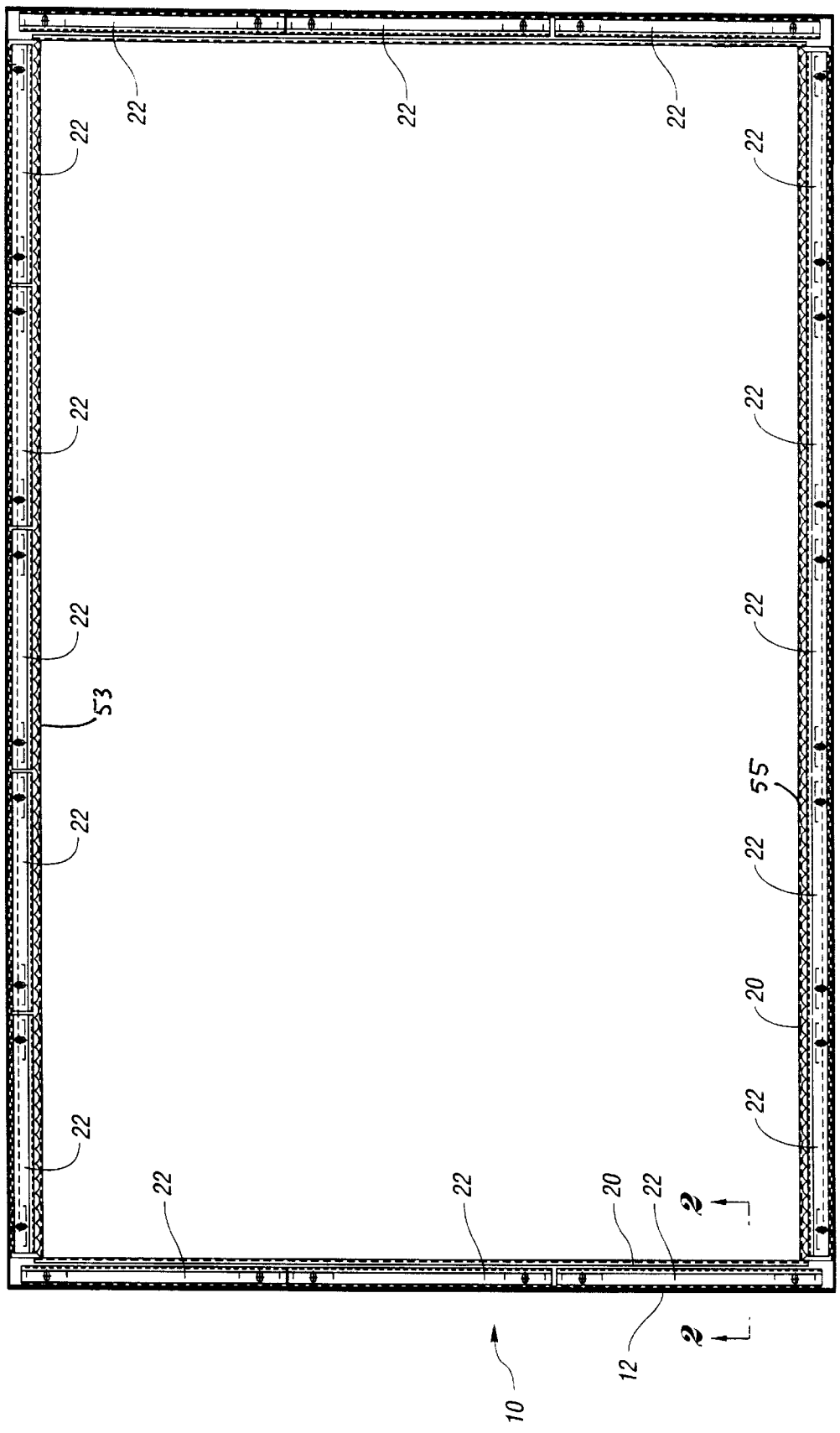
FIG. 1 shows a plan view of a support frame in accordance with the invention.

FIGS. 1–3 show embodiments of a frame construction configured for supporting peripheral edges of a sheet material. This invention is particularly configured for use with an apparatus for preheating a permeable thermoformable material, such as air laid or needled fiber mats, prior to thermoforming as described in commonly owned U.S. patent application Ser. No. 09/082,743. However, the structure described may be used for supporting a variety of sheet materials for different operations, such as heating, printing, punching, shearing, etc.

Referring to FIGS. 1 and 2, a first embodiment of the invention is shown. Specifically, an apparatus 10 is shown for supporting a thermoformable material along its peripheral edges. The apparatus 10 includes a non-porous frame 12 forming a channel 14 extending around the frame 12 for receiving the peripheral edges of a thermoformable material. The thermoformable material is shaped to span the entire frame 12 with its peripheral edges received within the channel 14 extending around the frame 12.

The channel 14 has an opening 16 formed between first and second edges 18,20 of the frame 12. A plurality of retaining arms 22 are positioned around the frame 12, and pivotally connected to the frame 12 along the first edge 18. Each retaining arm 22 has a distal end 24 which sweeps along an arc as the retaining arm 22 pivots about the pivot axis 26.

Each retaining arm 22 is pivotable between open and closed positions. In the open position, the distal end 24 is positioned outside the channel 14 such that a peripheral edge of the thermoformable material may be inserted into the channel. From this position, the retaining arm 22 is simply flipped down into the channel 14 in order to secure the edge of the thermoformable material within the channel 14.

In this closed position, the pivotable position of the retaining arm 22 is limited by the position of the adjustment screw 28, which is threaded through the retaining arm 22. Rotation of the adjustment screw 28 causes movement of the head 30, thereby adjusting the rotational position of the retaining arm 22 at which the head 30 contacts the back wall 32 of the frame 12.

The retaining arm 22 also includes a hook portion 34 to enable prying of the retaining arm 22 upward for removing the thermoformable material.

In the embodiment shown, the opening 16 of the channel 14 faces upward, and the retaining arm 22 pivots along the outside edge of the frame 12. However, the frame may be reconfigured such that the channel 14 opens inwardly or downwardly, and the retaining arm 22 may be moved accordingly to facilitate such a reconfiguration.

Turning to FIG. 3, an alternative embodiment of the invention is shown. As shown, a peripheral edge 40 of a thermoformable material 42, such as a PET Batt material, is inserted into the channel 44 formed by the frame 46. A retaining arm 48 is pivotally connected to the frame 46 about a pivot joint 50, and is movable between the closed position shown in FIG. 3 and the open position shown in phantom in FIG. 3. In the closed position, the distal end 52 of the retaining arm 48 is positioned within the channel 44, and in the open position shown in phantom, the distal end 52 of the retaining arm 48 is positioned outside the channel to allow insertion of the peripheral edge 40 of the thermoformable material 42 into the channel 44.

As shown, the distal end 52 sweeps an arc A as it pivots between the open and closed positions. A gap (g) is formed at the point in which the arc A is nearest the serrated edge 54 of the frame 46. As illustrated in FIG. 3, the gap (g) is less than the thickness (t) of the thermoformable material such that the thermoformable material 42 is pinched between the serrated edge 54 and the distal end 52 of the retaining arm 48 when the retaining arm 48 is in the closed position. Pivotal movement of the retaining arm 48 about the pivot joint 50 in the direction toward the closed position is limited by the position of the adjustment screw 56, i.e., it is restricted by engagement with the end 58 of the adjustment screw 56. Of course, the adjustment screw 56 may be attached to the frame 46 or to the retaining arm 48 to provide the same function.

When the thermoformable material 42 is pulled or tensioned as a result of hot air flowing therethrough, the distal end 52 of the retaining arm 48 grabs the thermoformable material 42 near its peripheral edge 40 and pinches the thermoformable material between the distal end 52 and the serrated edge 54 (such serrations 20 being visible along the top and bottom rails 53,55 of FIG. 1). Frictional engagement between the distal end 52 and the thermoformable material 42, as well as the stiffness of the thermoformable material 42, cooperate to form an over-center spring-type arrangement wherein the thermoformable material is clamped in position when the distal end 52 is moved past the edge 54 into the channel 44. This configuration prevents peripheral leakage of heated air which is blown or drawn through the thermoformable material as described in the related application referenced above. By preventing such heat losses, efficiency of the preheating process is improved.

The serrations 20 can be tailored in specific areas along the periphery of the frame 12 by increasing or decreasing the sharpness and number density per unit length (pitch) to grab or release thermoformable material to suit variable draw requirements during molding. This does not affect the ability of the holding frame to carry the molded part to the next work station.

The thermoformable material 42 is preferably formed in a rectangular shape corresponding with the overall shape of the frame 12 shown in FIG. 1 so that it may be supported along its peripheral edges for preheating prior to thermoforming, or other operations.

In order to facilitate robotic operation, only a single retaining arm would be used along each side of the frame, rather than the multiple retaining arms shown and described. Also, the through air convection heating with a pressure differential across the fibrous and permeable sandwich (thermoformable material) requires that air does not bypass the thermoformable material. The fact that this seal is achieved by the invention irrespective of the air flow direction (being from the top to bottom or otherwise) is a very important feature of the invention. This would not be possible in ordinary tenter frames with sharp nails or pins because the heated air would be leaked along the frame, thus resulting in significant losses in efficiency. However, with the present invention, there is no space for leakage along the peripheral edges of the thermoformable material because the frame is enclosed (non-porous) and the thermoformable material completely fills the gap between the distal end 52 of the retaining arm 48 and the serrated edge 54. Adjacent each tip of the serrations 20, the thermoformable material is compressed against the retaining arm(s) 48 and the thermoformable material completely fills the openings between the tips of the serrations (visible in FIG. 1 at reference number 20) because it is a multi-layer material having a tendency to maintain its thickness (t). Accordingly, no air or gas leaks through the frame because it is non-porous, and the peripheral edges are sealed by the thermoformable material which completely fills any gap between the distal end 52 of the retaining arm(s) and the serrated edge(s) 54, or non-serrated edge. Thus, the heated air only flows through the thermoformable material as desired, and heat losses along the frame 12 are prevented.

While the best modes for carrying out the invention have been described in detail, those familiar with the art to which this invention relates will recognize various alternative designs and embodiments for practicing the invention within the scope of the appended claims.

What is claimed is:

1. An apparatus for supporting a thermoformable material along its peripheral edges comprising:

a rectangular frame forming a channel along each side of the rectangular frame for receiving the peripheral edges of the thermoformable material, said channel having an opening formed between first and second edges of the frame;

at least one retaining arm pivotally connected to said frame along the first edge and having a distal end;

wherein the at least one retaining arm is pivotable between an open position to allow insertion of the peripheral edge of the thermoformable material into the channel and a closed position for clamping the thermoformable material between the distal end and the second edge to secure the peripheral edge and prevent peripheral leakage of heated air flowing in either direction through the thermoformable material; and wherein said closed position is defined by an adjustment screw which is threadedly engaged with one member selected from a group consisting of the retaining arm and the frame for abutting the other member of said group for adjusting the closed position of the at least one retaining arm with respect to the frame by limiting pivotal movement of the at least one retaining arm to the closed position.

2. The apparatus of claim 1, wherein the distal end is outside the channel when the retaining arm is in the open position and the distal end is inside the channel when the at least one retaining arm is in the closed position.

3. The apparatus of claim 1, wherein the distal end of the at least one retaining arm is pivotable along an arc (A) between the open and closed positions, and at the position in which the arc is nearest the second edge, a gap (g) is formed between the distal end and the second edge, wherein said gap (g) is less than the thickness (t) of the thermoformable material.

4. The apparatus of claim 1, wherein said second edge is positioned on a wall of the frame which is angled in a direction toward the channel.

5. The apparatus of claim 4, wherein said second edge is serrated.

6. The apparatus of claim 1, wherein said at least one retaining arm comprises a length between its pivot axis and its distal end which is less than a distance between said first and second edges.

7. An apparatus for supporting a sheet material along its peripheral edges comprising:

a non-porous frame forming a channel therealong for receiving the peripheral edges of the sheet material, said channel having an opening formed between first and second edges of the frame;

a plurality of retaining arms pivotally connected to said frame along the first edge and each having a distal end;

wherein each retaining arm is pivotable between an open position to allow insertion of the peripheral edge of the sheet material into the channel and a closed position for retaining the sheet material between the distal end and the second edge.

8. The apparatus of claim 7, wherein the distal end is outside the channel when each retaining arm is in the open position and the distal end is inside the channel when each retaining arm is in the closed position.

9. The apparatus of claim 8, wherein said closed position is defined by an adjustment screw which is threadedly engaged with one member selected from a group consisting of the retaining arm and frame for abutting the other member of said group for adjusting the closed position of the retaining arm with respect to the frame.

10. The apparatus of claim 7, wherein the distal end of each retaining arm is pivotable along an arc between the open and closed positions, and at the position in which the arc is nearest the second edge, a gap is formed between the distal end and the second edge, wherein said gap is less than the thickness of the sheet material.

11. The apparatus of claim 7, wherein said second edge is positioned on a wall of the frame which is angled in a direction toward the channel.

12. The apparatus of claim 11, wherein said second edge is serrated.

13. An apparatus for supporting a permeable thermoformable material along its peripheral edges for preheating prior to thermoforming, the apparatus comprising:

a frame forming a channel therealong for receiving the peripheral edges of the thermoformable material, said channel having an opening formed between first and second edges of the frame;

at least one retaining arm pivotally connected to said frame along the first edge and having a distal end;

wherein the retaining arm is pivotable between an open position in which the distal end is outside the channel to allow insertion of the peripheral edge of the thermoformable material into the channel, and a closed position in which the distal end is inside the channel for clamping the thermoformable material between the distal end and the second edge;

wherein the distal end of the retaining arm is pivotable along an arc between the open and closed positions, and at the position in which the arc is nearest the second edge, a gap (g) is formed between the distal end and the second edge, wherein said gap (g) is less than the thickness of the thermoformable material; and wherein said retaining arm includes a hook portion to facilitate prying of the retaining arm from the closed position to the open position.

* * * * *